March 21, 1967     E. A. SLADE     3,309,925
PIPELINE APPARATUS
Filed Oct. 15, 1963
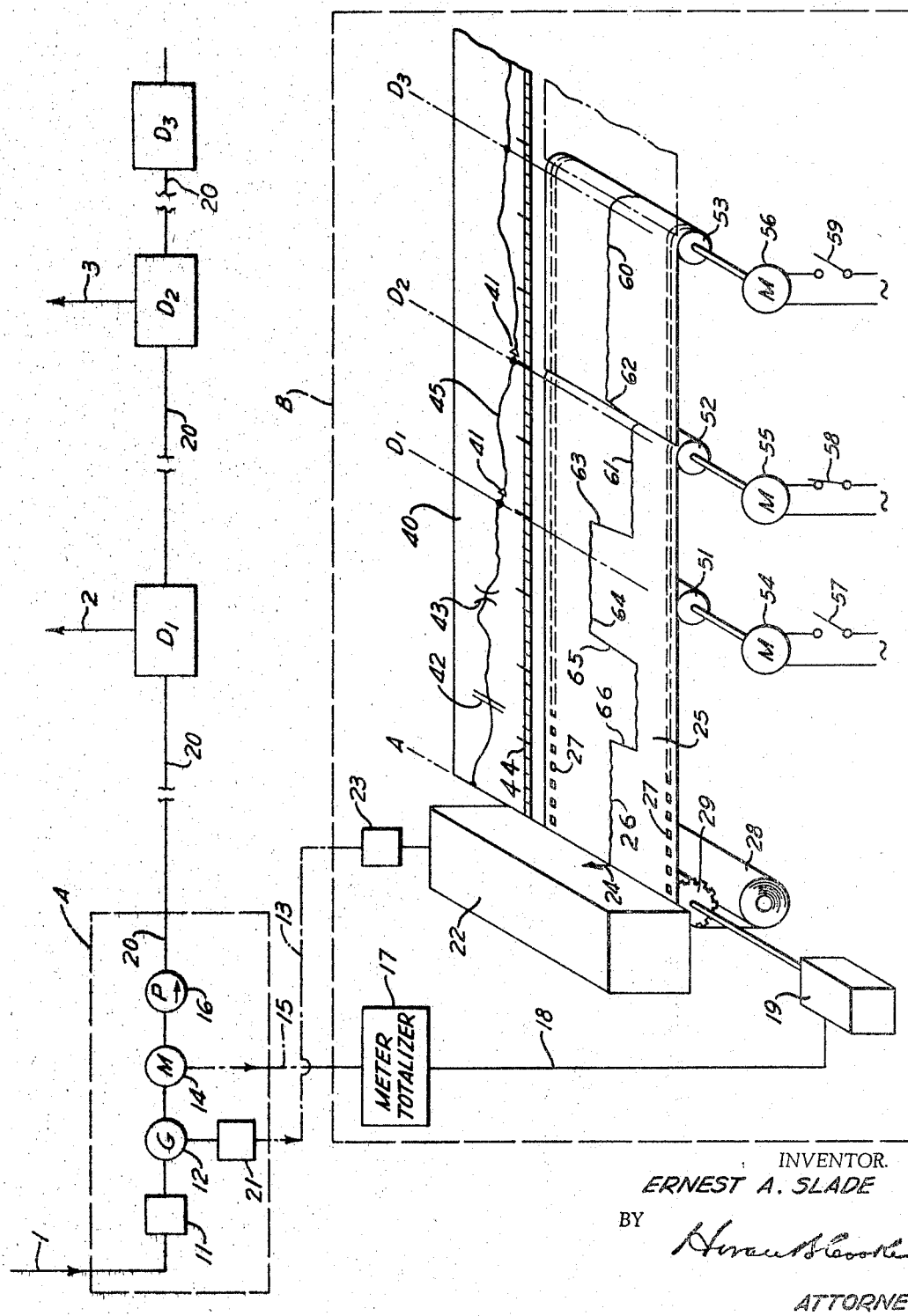
INVENTOR.
ERNEST A. SLADE
ATTORNEY.

United States Patent Office 3,309,925
Patented Mar. 21, 1967

3,309,925
PIPELINE APPARATUS
Ernest A. Slade, Tulsa, Okla., assignor to Warren Petroleum Corporation, Tulsa, Okla., a corporation of Delaware
Filed Oct. 15, 1963, Ser. No. 316,248
11 Claims. (Cl. 73—198)

This invention relates to pipeline operation and in particular concerns apparatus for monitoring the flow of liquids through a transportation pipeline.

Pipeline systems for the transportation of petroleum liquids are usually long stretches of pipe between pumping stations and terminals, with lateral connections at stations and terminals to provide delivery of products to appropriate tanks or other facilities at the destination. Valves are provided for switching at appropriate points, and such valves are usually electrically or pneumatically actuated and electrically controlled. In a modern pipeline system the entire pipeline operation is usually controlled from a central dispatching station. Supervisory surveillance and control are continuously maintained and the entire operation is usually monitored at the dispatching station. Various items of required information are telemetered to the dispatching station over conventional wire or microwave transmission channels and the information is displayed on a control panel on which there may also be provided switches, pushbuttons, and the like which control the position of valves and the operation of pumps in the pipeline system. Actual valve position may also be monitored and indicated on the control panel in order to provide complete information to the supervising operator or dispatcher.

Inasmuch as the volume of a long pipeline may be substantial it is a common occurrence for a long pipline to simultaneously contain several different liquid products, the different products having been introduced into the pipeline in succession at an injection point and following each other through the pipeline at substantially the same volumetric rate. With a long pipeline containing a number of such different liquid products it is obviously somewhat of a problem for the dispatcher to maintain surveillance of the respective product interfaces as they move in succession through the pipeline. The problem becomes increasingly complex when the pipeline has a plurality of delivery points and various succeeding products must be delivered to different delivery points. Furthermore, the products are valuable and misdelivery cannot be tolerated. The dispatcher must have a substantially complete conception of the entire operation and its progress from moment to moment in order to properly make remote control of appropriate valves and the like for dispatching purposes. Heretofore, the dispatcher has had to rely on telemetered information from various points along the pipeline and to manually trace progress of the operation and transport of the products. The present invention greatly facilitates surveillance of a pipeline operation and permits the dispatcher to supervise automatic switching operations that greatly increase efficiency of the pipeline system.

The present invention is directed to a dispatching control and visual display and surveillance system that permits the dispatcher to rely on automatic operation of certain important valves involved in the product switching operation after the delivery decision has been made, and that provides the dispatcher with a continuous picture of the pipeline's contents, the location and progress of product interfaces, a record of a physical characteristic of each product, and also provides a permanent record of the product as delivered to its destination.

Accordingly, it is an object of this invention to provide a pipeline operation visual surveillance apparatus that affords the dispatcher an instantaneous clear picture of the progress of the pipeline's contents.

It is a further object of this invention to provide apparatus that affords the dispatcher an immediate visual picture of the location of each product being transported in a pipeline.

It is a still further object of this invention to provide apparatus that produces a permanent record of the succession of liquid products transported by the pipeline identifying each product by a physical characteristic and indicating the transported volume of each product.

The invention is described in this specification with reference to the accompanying drawing forming a part thereof, and in which The figure is a diagrammatic illustration of a preferred embodiment of the apparatus of this invention.

In accordance with this invention there is provided apparatus comprising volumetric product measuring means in the pipeline at the product injection point where the pipeline accepts product for transport. The invention further comprises means on the pipeline for measuring at or near the injection point a characteristic parameter of the products transported. Signals from these two means are transmitted by conventional telemetering techniques to a central dispatching station which may be close to the injection point or more or less distant as desired. At the dispatching station an indicator of the measured characteristic parameter records its indication on a strip chart. The strip chart is driven in response to signals from the volumetric measuring means so that chart movement is in proportion to the volume of product injected into the pipeline. The strip chart is drawn out on a console in a substantially horizontal direction, and is moved over or alongside of a map or other correctly scaled pictorial representation in which linear map distance is proportional to volumetric pipeline displacement. Accordingly, the recorded characteristic of any particular batch of product moves along the pipeline displacement map exactly in proportion to actual transport of the product through the pipeline. If the pipeline is shut down, the chart stops, and if the pumping rate is increased, the chart speeds up. The dispatcher can therefore at all times at a glance see the exact instantaneous location of every batch of product in the pipeline and can with utmost confidence set up the necessary switching operations, or arm automatic switching equipment, in order to make appropriate deliveries as desired.

Referring to FIGURE 1, there is shown schematically a pipeline 20 connecting an originating trunk line station A and a number of delivery stations $D_1$, $D_2$, etc., spaced along the pipeline long distances apart. Each of these stations will be equipped with conventional pipeline equipment such as manual and remotely controlled valves, loops, meter-proving devices, scraper traps, safety controls and the like which are not shown in FIGURE 1 since these are conventional and are not per se a part of this invention. At the originating trunk line station A the product to be transported is accepted from a source 1 which may, for example, be a gathering system, tankage, an interconnecting pipeline system, refinery, or the like. Delivery of various products is to be made to assigned lateral connections 2, 3, etc., at the respective delivery stations $D_1$, $D_2$, etc. The product entering the pipeline is passed through a filter 11 whose purpose is to remove any foreign matter from the product. The product then passes through a product parameter measuring device 12 that is responsive to a parameter whose value is characteristic of and identifies the product accepted by the pipeline. It is preferred to employ as device 12 a continuously measuring gravitometer, such as the radioactive type of specific gravity gauge made by Ohmart Corporation, of Cincinnati, Ohio. The radioactive gravitometer cell 12 is connected to an amplifier 21 which also has any telemetering equipment that may be required. The gravitometer 12 measures the specific gravity of the product flowing through the pipeline and a signal output is obtained from its amplifier 21 that is representative of the measured specific gravity and this signal is transmitted over a channel indicated generally by the line 13. Alternatively, the measured parameter may comprise the dielectric constant of the product, or its color, or other characteristic parameter.

From the gravitometer 12 the product passes into a volumetric meter 14 which measures units of volume of product flowing into the pipeline. Meter 14 may be any commercially acceptable conventional type having the required precision and which accurately measures volume of the type of product being transported by the pipeline. By way of example, in the transportation of hydrocarbon fuels the meter 14 may be a turbine meter such as manufactured by Potter Aeronautical Corporation, of Union, New Jersey.

From the meter 14 the product goes to the suction side of the pipeline pump 16 which is driven by a conventional prime mover (not shown) and which delivers the product under pressure to the trunk line of pipeline 20. The transported product continues uninterrupted to the delivery point $D_1$, and if delivery is not to be made at $D_1$, continues on to succeeding delivery points in usual manner.

The volume of pipeline 20 is usually quite substantial and may, for example, for nominal size 6⅝ inch pipe be of the order of 20,000 barrels per hundred miles. It is apparent that if the pipeline accepts in succession various volumes of different products from one or more sources 1 and these products are pumped in succession into the pipeline 20, there will during normal operation exist in the pipeline a series of irregularly spaced successive interfaces between the respective successive products. In a typical pipeline operation there may be as many as fifty or more such interfaces between successive products. Each of the products may require delivery at different delivery points, and in order to properly control operations of the pipeline, it is essential for the operator to continually be aware of the existence and location of these interfaces. By employing the apparatus of this invention the operator can supervise and control switching operations in such manner as to make maximum use of the pipeline equipment and avoid false deliveries.

The central surveillance and dispatching control station equipment employed in this invention is indicated by the equipment inside the dashed line rectangle B. The equipment B may be located at any convenient place but is usually at the dispatching station which is connected with the originating trunk line station and various delivery points by means of conventional communication, telemetering, and signalling channels. These channels involved with equipment B are not indicated in detail in FIGURE 1 since they are conventional, but are represented by a simple dot and dashed line, as for example, line 13 previously mentioned.

At the dispatching station the equipment B comprises a recorder 22 that is responsive to the output signal of the characteristic parameter measuring device 12, e.g. the gravitometer previously mentioned. It is to be understood that the telemetering channel 13 is provided with means 23 that may be required for converting the telemetered signals to a form that will serve as input signal for recorder 22. The recorder 22 has a recording pen indicated diagrammatically by 24 which records on a strip chart 25. While any type of recorder may be used that records different values of the measured parameter in contrasting manner, it is preferred to employ a type of recorder that draws on the strip chart 25 an analog record of the product parameter measured as the product is injected into the pipeline. By way of example, recorder 22 may comprise the recording pen and slide-wire mechanism of a "Brown Electronik" recorder manufactured by Minneapolis-Honeywell, of Philadelphia, Pennsylvania. The deflection of the recording pen 24 is an analog of the measured parameter value, e.g. the specific gravity of the product flowing in pipeline 20. The curve drawn by the recorder pen is indicated by the curve 26 on chart 25. Each time that a different product is injected into the pipeline the pen 24 will record the discontinuity in the measured parameter that occurs at the interface between the two products. In the figure such interfaces are shown recorded at 62, 63, 65, and 66.

The strip chart 25 is provided with perforations 27 near its outer edges as is conventional in this type of recorder. The chart paper 25 originates from a supply spool 28 in the lower portion of the recorder and passes upward around a toothed roller 29 that engages the perforations 27. A table, cabinet, console, or the like (not shown) is provided over which the strip chart 25 is drawn from the roller 29 by means of a take-up spool and equipment to be described later. The recording system comprising the elements 12, 21, 13, 23, and 22 is preferably calibrated so that the indications of recording pen 24 read directly in units of the measured parameter, as for example, specific gravity units. If desired, for improved precision the recorder 24 may be provided with conventional suppressed zero so that the chart 25 covers only a parameter range of interest.

The indications of meter 14 are usually in the form of pulses or other signals each of which represents the passage of a given volume of product through the meter 14. These signals are transmitted over telemetering channel 15 to a meter totalizer 17. It is apparent that for operational and accounting purposes it may be desirable to have more than one meter totalizer similar to 17 located at various other points on the pipeline system, but since these totalizers do not relate to the present invention they are not shown. The output of meter totalizer 17 is usually in the form of a shaft rotation, e.g., rotation of a numerical counter, whose signal is indicated in FIGURE 1 as transmitted by a mechanical or electrical connection indicated by 18. The connection 18 drives a gear box 19 which in turn drives the shaft of the chart-advancing roller 29. The gear box 19 is preferably ratchet driven so that chart 25 cannot back up, and in corresponding relation the pipeline 20 is usually provided with a check valve (not shown) which prevents reverse flow in the pipeline in the event of a shutdown or emergency condition.

The gear ratio of gear box 19 is arranged so that the total volume of the pipeline from one end to the other corresponds to a reasonable movement of strip chart 25. By way of example, if the pipeline 20 is 6⅝ inch pipe and has a total length from injection station A to the farthest delivery point D of 300 miles, then the gear box 19 may, for example, be arranged to move the strip chart 25 a distance of one inch for each 400 barrels of product pumped. Since 6⅝ inch pipe has a volume of about 200 barrels per mile, it is seen that one inch motion of the strip chart corresponds to about two miles of product travel in the pipeline. Traverse of the entire 300 mile pipeline therefore corresponds to a strip chart motion of about 150 inches or 12½ feet which is a convenient length with which to work. Accordingly the table or console (not shown) over which the strip chart 25 is drawn is made about this long or slightly longer. Obviously for a line of some other length or diameter the gear box 19 is appropriately designed to give a reasonable distance of chart travel. While the strip chart 25 is shown in FIGURE 1 as lying in a horizontal plane, it is apparent that the recorder 22 may be tipped and that it may lie in a vertical plane with the strip chart drawn out along a wall, in which event the total travel of the chart may conveniently be extended by turning a corner around a roller. It is further apparent that a track (not shown) may be provided in which the strip chart moves in order to keep the chart flat against the console or wall.

Along one or both edges of the path of strip chart 25, or behind the chart if the chart paper is sufficiently transparent, there is placed a special map 40 of the pipeline. The term map is used here to mean a pictorial representation of the pipeline and its respective stations. On the map the longitudinal scale factor relates linear longitudinal map distance to actual displacement volume of the pipeline. On the map 40 each point corresponds to a point along the pipeline, and equal longitudinal distance increments on the map bear a constant relationship to equal displacement units of the pipeline. The scale factor, i.e. length on the map per unit of pipeline volume, is the same as the ratio of chart (25) movement to metered (14) volume. Thus in the above-mentioned example the scale factor is one inch equals 400 barrels. The injection station A on the map is placed in longitudinal alignment with the recording pen 24 of the recorder, and the map will show the longitudinal location of the respective delivery stations $D_1$, $D_2$, etc. in terms of barrels from the injection station. It is convenient to draw a scale such as 44 on the map showing pipeline displacement from the injection station, and it is also found convenient to provide one or more reverse scales (not shown) showing displacement from the one or more delivery stations back to the injection station.

Attention is called to the fact that linear distance intervals on the map correspond to linear distance intervals along the pipeline only if the size of the pipe remains constant. Thus for example, if the map scale factor is one inch equals 400 barrels then one inch on the map will represent about two linear miles of 6⅝ inch pipe (nominal size), but one inch on the map will represent about 4¾ miles of 4½ inch pipe, or about 1.17 miles of 8⅝ inch pipe, or only 0.21 mile of 20 inch pipe. Inasmuch as the internal displacement of various sizes of pipe are accurately known, the map and adjacent scales are easily arranged to take care of the various internal pipe diameters that may make up the pipeline. It is, for example, common to use heavier pipe for stream crossings or other sections where the pipeline is exposed.

Every point on the strip chart 25 moves in proportion to the volume of product (as measured by meter 14) injected into the pipeline at point A and therefore the map and displacement scale 44 contiguous to the edge of the strip chart 25 permits the dispatcher to easily and instantaneously visualize (in terms of displacement) the exact position of any product in the pipeline. It is also advantageous to show on the map locations (to correct displacement scale) of check valves 41, road crossings 42, stream crossings 43, traps, etc. whose locations are important to know in the event of a leak or other emergency. It is further desirable to show on the map the geographical elevation of each point of the pipeline as by drawing a profile curve 45 along one edge of the map. The locations of the various stations $D_1$, $D_2$, etc. are indexed substantially across the console for convenient observation and reference. It is apparent that the recorded interfaces such as 63, 65, and 66 clearly show the position of the respective intervening products at all times during their traverse of the pipeline.

Longitudinally aligned with the properly scaled location of each delivery station $D_1$, $D_2$, etc., the console is provided with a slot immediately below which is mounted a motor-driven chart take-up roller such as 51, 52, and 53. The take-up rollers 51–53 are respectively driven by torque motors 54, 55, and 56 that are powered from A.C. current. Only one of the take-up rollers is in use at any one time and the motors 54–56 each produce sufficient torque to keep the chart 25 taut without tearing. Each motor is preferably provided with a centrifugal or other type of brake (not shown) to prevent running away in the event the chart is severed. Each motor 54–56 is provided with a manually operated on-off switch 57, 58, and 59.

By way of example to illustrate operation of the invention, let it be assumed that product represented by the recorded characteristic 60 was in the process of delivery at station $D_3$, and that the product represented by the recorded characteristic 61 is scheduled to be delivered to station $D_2$. During delivery of product represented by 60 the chart 25 will be rolled up on take-up roller 53 located at the point on the map corresponding to the location of station $D_3$. Just prior to the time that the interface indicated by 62 on the strip chart reaches the map location $D_2$, the dispatcher will by remote control arm an automatic valving and switching apparatus at station $D_2$. A preferred form of automatic switching apparatus is described and claimed in copending application by Ernest A. Slade and Joseph C. Turk, Ser. No. 316,325, now U.S. Patent No. 3,277,918, filed on the same date as the present application and assigned to the same assignee as the present application. After the switch has actually been executed at station $D_2$, this fact is telemetered back to the dispatcher by way of a conventional telemetering channel and indicated on the dispatcher's control panel (not shown). The dispatcher then opens the switch 59 and transversely cuts the chart 25 at the interface recorded at 62. It is apparent that while delivery of product represented by 61 is taking place at station $D_2$, the pipeline between stations $D_2$ and $D_3$ is shut in, and that part of the chart showing the tail end of product represented by 60 is stopped. The chart showing the beginning of product represented by 61 is threaded onto roller 52 which takes up the chart 25 upon closing switch 58. Let it be assumed by way of example that the next succeeding product represented by the recorded characteristic 64 is scheduled to be delivered at station $D_3$. Then when the end of the product represented by 61 approaches the $D_2$ mark and prior to the recorded interface 63 actually reaching the map location of station $D_2$, the dispatcher will arm an automatic switching sequence at station $D_2$ to close the valve in the lateral 3 and again open the main-line valve. When the recorded interface 63 reaches station $D_2$, this switching operation is locally executed and telemetered back to the dispatching station. The dispatcher now opens switch 58 and transversely cuts the chart 25 at the recorded interface 63. A permanent record of product represented by 61 as delivered at station $D_2$ is thus provided on take-up roller 52. The oncoming end of the chart 25 is then spliced to the trailing end of the chart previously cut at 62, as by means of transparent pressure-sensitive tape. Switch 59 is now closed, and the chart 25 continues to roll up on take-up roller 53. It is thus seen that as soon as delivery of product represented by 61 to station $D_2$ is completed, the product in the trunk line between $D_2$ and $D_3$ again begins to move and the now spliced chart correctly depicts the new succession of products in the line and shows the progress of their motion. Accordingly the dispatcher has continually before him a complete visual representation of all the products in the entire pipeline. The dispatcher may actually be many miles from the actual pipeline, but the chart 25 on which each successive product is identified, as by specific gravity or other parameter, moving along the pipeline displacement map gives the dispatcher a clear and complete picture of the entire situation at every instant. If desired, the dispatcher may mark on the chart 25 opposite each recorded characteristic its schedule or ticket number or any other identifying information that will subsequently be useful in accounting procedures.

It is apparent that by means of the apparatus of this invention there is presented to the dispatcher a complete picture of the pipeline, its various contents, and the delivery being made. Furthermore there is provided for each delivery a permanent record of how the delivery was made. With such an instantaneous and complete picture before him the dispatcher can operate the pipeline with a minimum of supporting personnel and the chance of error is correspondingly reduced to a minimum.

While the figure shows only one product parameter measuring device 12 whose response is recorded on recorder 22, it is evident that more than one parameter may be measured by employing a plurality of devices 12 each of which measures a different type of parameter. The recorder 22 employed is then a so-called multipoint recorder which employs either separate pens 24 for each parameter or which sequentially records the respective parameters in repeated succession, such recorders being well known in the art. As previously stated, the preferred parameter to be measured for identifying the various pipeline products is specific gravity, and other recorded parameters may, for example, be temperature, pressure, moisture content, or the like which are useful information for specific purposes. The recording of two or more product-identifying parameters, such as specific gravity and dielectric constant, is also helpful in more positively distinguishing between products that differ only slightly in any one parameter.

It is apparent that if the pipe line has more than one acceptance point such as A along its length, the dispatcher's console may be provided with more than one recorder head 22 each of which is longitudinally aligned with the point on the map 40 that corresponds to its location on the pipeline, the location being determined in terms of line displacement in accordance with the nature of map 40. In such event the console is provided with more than one run or track for the additional strip charts 25. It is further apparent that separate section maps such as 40 may be provided for each strip chart run if desired.

The pipeline map or maps employed may be highly detailed or very simple showing only the respective acceptance points and delivery points, but the map 40 and scale 44 serve to give the dispatcher a visual picture of the intervening pipeline displacements. As the product interfaces recorded on the chart or charts 25 progress along the map or maps 40, the exact position of each interface and the intervening products is clearly depicted at every stage of the operation. In the previously mentioned example of a 6⅝ inch pipeline about 300 miles long for which the console and displacement scale is about 12½ feet long, the dispatcher can easily visually locate each batch of product to within 50 barrels of its actual position in the pipeline. Higher precision can, of course, be obtained by increasing the travel of chart 25 and correspondingly expanding the map 40 and scale 44.

What I claim as my invention is:

1. Apparatus for monitoring at a monitor location the simultaneous transportation of a plurality of products in a pipeline having an acceptance point and a plurality of spaced delivery points which comprises volumetric measuring means connected to the pipeline at the acceptance point, means connected to the pipeline at the acceptance point responsive to a characteristic parameter identifying the product accepted, recording means at the monitor location connected to said parameter-responsive means and adapted to record the indication thereof, a continuous movable chart adapted to traverse said recording means, said chart being cooperable with said recording means to continuously record the responses of said parameter-responsive means on said chart, said chart being cooperable with said recording means to continuously record the responses of said parameter-responsive means on said chart, chart advancing means connected to said volumetric measuring means adapted to advance said chart in proportion to the volume of product accepted, and plurality of chart take-up means spaced from each other by distances proportional to the actual pipeline volume between said delivery points, whereby the number of different products and the amount of each product delivered to each of said delivery points is indicated by the portions of said chart on each of said take-up means.

2. Apparatus for monitoring at a monitor location the simultaneous transportation of a plurality of products in a pipeline having an acceptance point and a spaced delivery point which comprises volumetric measuring means connected to the pipeline at the acceptance point, means connected to the pipeline at the acceptance point responsive to a characteristic parameter identifying the product accepted, recording means at the monitor location connected to said parameter-responsive means and adapted to record the indication thereof, a continuous movable chart adapted to traverse said recording means, said chart being cooperable with said recording means to continuously record the responses of said parameter-responsive means on said chart, chart advancing means connected to said volumetric measuring means adapted to advance said chart in proportion to the volume of product accepted, and chart take-up means at the monitor location spaced from said recording means a distance proportional to the volume of said pipeline between said acceptance point and said delivery point, whereby said continuous chart between said acceptance point and said delivery point gives a continuous, instantaneous display of the relative positions of the interfaces between the various products within said pipeline.

3. The apparatus of claim 1 wherein said parameter-responsive means is responsive to the specific gravity of the accepted product.

4. The apparatus of claim 2 wherein said parameter-responsive means is responsive to the specific gravity of the accepted product.

5. The apparatus of claim 1 wherein said recording means records the indication of said parameter-responsive means in analog form on said chart.

6. The apparatus of claim 2 wherein said recording means records the indication of said parameter-responsive means in analog form on said chart.

7. In combination, a pipeline adapted to simultaneously carry a plurality of different products, said pipeline comprising an input station and at least one delivery station in spaced relation to said input station, identifying means at said input station responsive to a characteristic parameter of said products to identify the product passing through said input station at any one instant, volume measuring means at said input station to indicate the volumetric rate of product passage through said input station, indicating means at said input station, means connecting said indicating means to said identifying means, whereby said indicating means indicates what product is passing through said input station at any one time, continuous record means, means connecting said measuring means and said record means to move said record means in relation to said indicating means at a speed proportional to the volumetric rate of product passage through said input station, said record means being cooperable with said indicating means to continuously record the responses of said identifying means on said record means, record take-up means spaced from said indicating means a distance proportional to the volume of said pipeline between said input station and said delivery station, whereby said continuous record means between said indicating means and said take-up means gives a continuous, instantaneous display of the relative positions of the interfaces between the various products within said pipeline.

8. The combination of claim 7, and stationary map means of the pipeline volume positioned adjacent said continuous record means between said indicating means and said take-up means.

9. The combination of claim 7, said pipeline comprising a plurality of delivery stations, a plurality of record take-up means spaced from each other by distances proportional to the actual pipeline volume between said delivery stations, whereby the number of different products and the amount of each product delivered to each of said delivery stations is indicated by the portions of said record means on each of said take-up means.

10. The combination of claim 7, said record means comprising a paper chart, and said indicating means comprising a pen to continuously mark said chart.

11. The combination of claim 9, said record means comprising a paper chart, said indicating means comprising a pen to continuously mark said chart, said take-up means each comprising a roller, constant torque motor means driving each of said rollers, and manual switch means controlling each of said motors.

References Cited by the Examiner

UNITED STATES PATENTS

| | | | |
|---|---|---|---|
| 64,456 | 5/1867 | Storm | 73—198 |
| 2,398,562 | 4/1946 | Russell | 73—152 |
| 2,528,956 | 11/1950 | Hayward | 73—151 X |

FOREIGN PATENTS

| | | |
|---|---|---|
| 6,776 | 3/1903 | Great Britain. |

JAMES J. GILL, *Acting Primary Examiner.*

RICHARD C. QUEISSER, *Examiner.*

E. D. GILHOOLY, *Assistant Examiner.*